Aug. 24, 1948.    A. A. WARNER    2,447,882
UNIVERSAL JOINT
Filed May 1, 1944

Inventor:
Archibald A. Warner

Patented Aug. 24, 1948

2,447,882

UNITED STATES PATENT OFFICE 2,447,882

UNIVERSAL JOINT

Archibald A. Warner, Rockford, Ill., assignor to Borg-Warner Corporation, Chicago, Ill., a corporation of Illinois Application May 1, 1944, Serial No. 533,585

10 Claims. (Cl. 64—17)

The present invention relates to universal joints. It is one of the principal objects hereof to simplify the construction of a universal joint and to improve the efficiency, operation and dependability of such universal joint.

Another principal object of the present invention is to provide means in a universal joint that is adapted to effect a reduction of friction between the relatively movable parts thereof.

A further object hereof is to provide a universal joint wherein the cross member, that is usually an oscillatory spider having radially disposed trunnions movably journaled in the yoke arms, is dispensed with, and in lieu thereof the connections between the cross member and the yoke arms is effected by means of antifriction devices such as balls, rollers, or the like that are positioned in annular races fixed on the cross member and on the confronting portions of the yoke arms.

It is another object of the present improvements to provide anti-friction races on the cross member in the form of cup-shaped metal stampings that are brazed or otherwise suitably anchored to opposite portions of the cross member. In this connection it is an aim to provide races that are fixed with relation to the yoke arms and which comprise protuberances that project toward each other inwardly from the yoke arms and are surrounded by races on the cross member to provide the means upon which the cross member is bodily movable. Furthermore, the anti-friction devices that are positioned in the confronting races effect the operative connection between the cross member and the respective yokes.

Additional objects, aims, and advantages of the invention contemplated herein will be apparent to persons skilled in the art after the construction and operation of the universal joint is understood from the within description.

It is preferred to accomplish the numerous objects of this invention and to practice the same in substantially the manner hereinafter fully described and as more particularly pointed out in the appended claims, reference being made to the accompanying drawings which form a part of this specification, wherein:

The drawings are to be understood as being more or less of a schematic character for the purpose of disclosing typical or preferred forms of the invention contemplated herein and in these drawings like reference characters identify the same parts in the several views.

In its broadest aspect, the present invention comprises a cross member intermediately disposed between the yokes of driving and driven members or shafts, the said yokes being operatively connected to the cross member by means of anti-friction devices operating in annular portions of protuberances that project inward from adjacent portions of the yoke arms. This arrangement takes the place of the usual center member or spider-shape to provide radial trunnions that are operatively connected to and journaled in the yokes.

Figure 1:
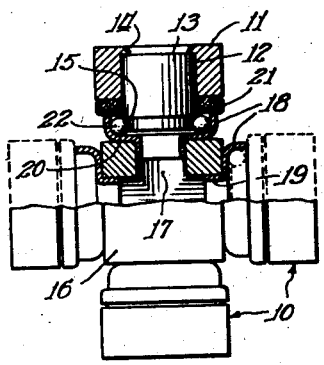
Fig. 1 is an elevational view partly in section of a universal joint embodying the improvements contemplated herein.
Figure 2:
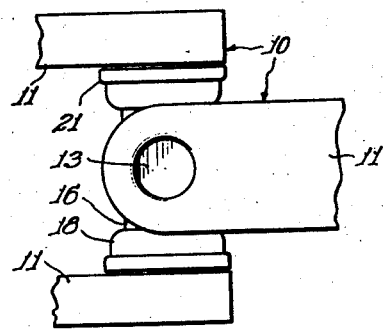
Fig. 2 is a vertical side elevation thereof.

The arrangement shown in Figs. 1 and 2 comprises a pair of yokes 10 having spaced arms 11, alternate ones of which are disposed in opposite directions, and the end portions of the arms of each yoke are provided with transverse bores 12 that have their axes coincident to or aligned with each other. The bores in one pair of arms are disposed so that their common axis intersects the common axis of the bores in the other yoke arms, and all of these bores provide means for mounting fixed plugs 13 of cylindrical cross section that are fitted tightly into said bores. After the plugs have been properly positioned in the bores, with their outer ends back of or inside the outer ends thereof, they are anchored in place by staking as indicated at 14 in Fig. 1. The inner ends of the plugs 13 that project toward each other from the respective yokes provide protuberances projecting beyond the confronting inner faces of their yoke arms. At their inner end portions these protuberances are reduced in diameter and the two diameters are joined by an arcuate surface to provide annular races 15 for suitable anti-friction devices in the manner hereinafter described.

A block 16 is interposed between the ends of the yoke arms, the block performing the function of a center member or cross member of the universal joint, and in performing this function, it is adapted for oscillatory movement by rotation upon a plurality of axes each axis intersecting the other axis at substantially a right angle. These rotational axes of the block 16 also are coincident or aligned with the axes of the respective pairs of plugs 13. The block has diametrically oppositely disposed sockets 17 that are formed preferably by boring the block from two of its sides in a manner to intersect at the center of the block.

Races 18 for anti-friction devices are provided on the block for coaction with and in confronting relation to the races 15 on the inner ends of the plugs 13. The races 18 shown in Figs. 1 and 2 comprise metal stampings that have cup-shaped outer portions forming the races 18 that surround the races 15 on the adjacent plugs 13, and centrally of these cupped portions the stampings are provided with hollow stubs 19 that are inserted in the sockets 17 of the cross member 16 and are brazed or otherwise anchored therein. The intermediate portions 20 of the stampings between the stubs and the cupped portions are approximately flat so that they will contact the flat surfaces of the cross member that define the edges of the sockets 17, and these flat portions of the stampings are likewise anchored to the cross member by brazing or otherwise. Suitable rings 21 of L-shape cross section are interposed between the rims of the races 18 and the adjacent inner faces of the yoke arms 11 to retain and act as seals to prevent escape of lubricant from the universal joint, and the inner portions of these seal-retaining rings 21 project toward the plugs 13 beyond the anti-friction balls 22 in the confronting races 15 and 18. The balls 22 are arranged in annular rows that surround and are spaced radially from the axes of the plugs. After the parts of the universal joint have been assembled, the staking 14 is applied to the ends of the plugs 13 to effect the maintenance of said plugs in fixed relation to the yoke arms 11 and the cross member 16. Alternatively, the stampings may be assembled in, and brazed to, the central block, the plugs may be staked and brazed to the arms and the joint then assembled by inserting the plugs into the stampings with the anti-friction balls between, the arms being secured to the driving and driven shafts as the final step.

Figure 3:
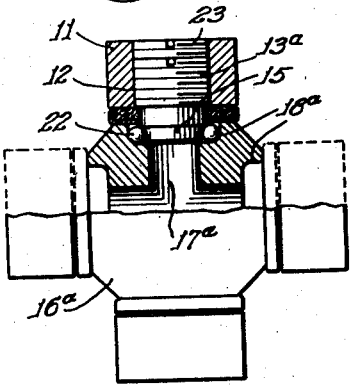
Fig. 3 is a view similar to Fig. 1 showing a modified form of the universal joint.
Figure 4:
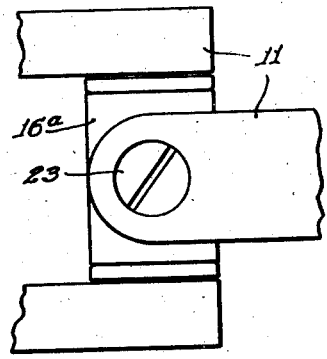
Fig. 4 is a vertical side elevation thereof.

The modified structure shown in Figs. 3 and 4 comprises an assembly wherein the cupped stampings of the universal joint shown in Figs. 1 and 2 have been dispensed with, and in lieu thereof the block 16a forming the cross member is recessed on its outer faces to provide the races 18a that are formed by increasing the bores of the sockets 17a to provide the shoulder in the manner shown in Fig. 3. In this instance, the dimensions of the block are larger than the dimensions of the cross member block 16 in the assembly that is shown in Figs. 1 and 2. The plugs 13a that provide the protuberances in this modified structure have the races 15 at their inner ends in confronting relation to and surrounded by the races 18a, and the body portions of plugs 13a may be provided with threads whereby they may be screwed into the bores 12 that are similarly threaded to receive them. The plugs are maintained in fixed positions by means of threaded locking discs 23 that are screwed into the threaded bores and clamp against the outer ends of said plugs. Alternatively, the plugs may have smooth bodies and may be brazed or otherwise fixedly secured in unthreaded bores in the yoke arms for maintaining them in proper relation to the coacting portions of the assembly.

Figure 5:
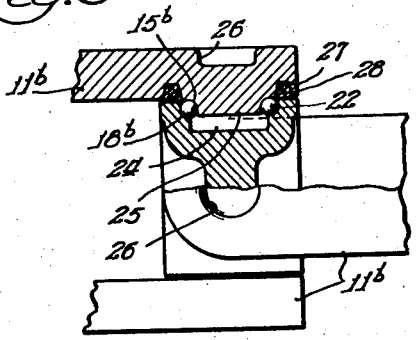
Fig. 5 is a fragmental section of another modified form of the universal joint.

Fig. 5 shows a further modified type of assembly for a universal joint such as contemplated herein. In this assembly the cross member is not transversely bored as in the other types that have been hereinbefore described, but its outer portion is provided with diametrically oppositely disposed recesses 24 that are formed with concave annular races 18b near the edges thereof for receiving the annular rows of anti-friction balls 22. The arms 11b of the yokes are provided with protuberances 25 that project inwardly toward each other beyond the inner faces of each pair of arms. These protuberances 25 are formed by subjecting the arms 11b to pressing operations between dies whereby indentations 26 are made in the outside faces of the arms and the approximately counterpart protuberances 25 are projected away from the inside faces of the arms. The margins of the protuberances are concave in cross section to provide the races 15b that confront and are surrounded by the races 18b that are formed on the adjacent marginal portions of the recesses 24 in the cross member. The inner faces of the yoke arms 11b near or in contact with the adjacent surfaces of the cross member are provided with annular channels 27 that provide seats in which seal rings or fiber gaskets 28 are inserted to prevent escape of the lubricant from the universal joint. The assembly shown in Fig. 5 preferably constitutes an exemplification in its broadest aspect of the improvements that are contemplated herein.

While this invention has been described in detail in its present preferred forms or embodiments, it will be apparent to persons skilled in the art, after understanding the improvements, that various changes or modifications may be made therein without departing from the spirit or scope thereof. It is aimed in the appended claims to cover all such changes and modifications.

I claim:

1. A universal joint comprising a pair of yokes; the arms of each yoke being provided with aligned bores; plugs fixed in said bores and projecting toward each other; an oscillatory center member; sockets in said center member aligned with said plugs; stampings having stub portions anchored in said sockets and cup-shaped portions surrounding the inner portions of said plugs; and a plurality of anti-friction members in each of the cupped portions of said stampings and engaged by the inner portions of said plugs.

2. A universal joint comprising a pair of yokes, the arms of each yoke being provided with protuberances that project beyond the inner surfaces of the yoke arms, the inner portions of said protuberances being formed with races for anti-friction devices; an oscillatory cross member; stampings having stub portions anchored in diametrically opposite portions of said cross member and having cup-shaped portions opening toward said yoke arms, said cup-shaped portions providing races that confront the races on said protuberances; and a plurality of anti-friction devices cooperating with each of said confronting races.

3. In a universal joint, a yoke, the arms of said yoke being provided with protuberances that project beyond the inner surfaces of the yoke arms, inner portions of said protuberances being formed with races for anti-friction devices; an oscillatory pivot member having sockets aligned with said protuberances; race elements anchored in said sockets and having race portions surrounding the inner portions of said protuberances and confronting the races on said protuberances; a plurality of anti-friction devices cooperating with said confronting races; and lubricant seals interposed between said elements and the inner surfaces of each of said yoke arms and engaging the inner portions of said protuberances.

4. In a universal joint, a yoke, the arms of said yoke being provided with protuberances that project beyond the inner surfaces of the yoke arms, inner portions of said protuberances being formed with races for antifriction devices; an oscillatory pivot member having sockets aligned with said protuberances; race elements anchored in said sockets and having race portions surrounding the inner portions of said protuberances and confronting the races on said protuberances; a plurality of anti-friction devices cooperating with said confronting races; and lubricant seals each comprising an annular member having a cup-shaped cross section and opening toward a yoke arm, and a gasket in said annular member, said gasket being pressed into engagement with the underside of the yoke arm and with the inner portion of its protuberance.

5. A universal joint comprising a pair of yokes, the arms of each yoke being provided with aligned bores; plugs fixed in said bores and projecting toward each other; an oscillatory center member having sockets aligned with said plugs; metal stampings having stub portions anchored in said sockets and cup-shaped portions surrounding the inner portions of said plugs; a plurality of anti-friction members in each of the cupped portions of said stampings and engaged by the inner portions of said plugs; and lubricant seals each comprising an annular member having a cup-shaped cross section seated against a cupped portion of a metal stamping and opening toward a yoke arm and a gasket seated in said annular member and pressed into engagement with the under side of the yoke arm and with the inner portion of its plug.

6. A universal joint comprising a pair of yokes, the arms of each yoke being provided with protuberances that project beyond the inner surfaces of the yoke arms, the inner portions of said protuberances being formed with races for anti-friction devices; an oscillatory cross member; stampings having stub portions anchored in diametrically opposite portions of said cross member and having cup-shaped portions opening toward said yoke arms providing races that confront the races on said protuberances; a plurality of anti-friction devices cooperating with each of said confronting races; and lubricant seals each comprising an annular member having a cup-shaped cross section seated against a cupped portion of a metal stamping and opening toward a yoke arm and a gasket seated in said annular member and pressed into engagement with the under side of the yoke arm and with the inner portion of its protuberance.

7. A universal joint comprising a pair of yokes, the arms of each yoke being provided with projections extending toward each other; an oscillatory pivot member having sockets aligned with said projections; stampings anchored in said sockets and comprising cup-shaped portions surrounding the inner portions of said projections; and a plurality of anti-friction members in each of the cupped portions of said stampings and engaged by the inner portions of said projections.

8. A universal joint comprising a pair of yokes, the arms of each yoke being provided with projections extending toward each other; an oscillatory pivot member having sockets aligned with said projections; stampings anchored in said sockets and comprising cup-shaped portions surrounding the inner portions of said projections; a plurality of anti-friction members in each of the cupped portions of said stampings and engaged by the inner portions of said projections; and lubricant seals interposed between the pivot member and the inner surfaces of each of said yoke arms and engaging the inner portions of said projections.

9. A universal joint comprising a pair of yokes, the arms of each yoke being provided with aligned bores; plugs fixed in said bores and projecting toward each other; an oscillatory center member having sockets aligned with said plugs; stampings having stub portions anchored in said sockets and cup-shaped portions surrounding the inner portions of said plugs; a plurality of antifriction members in each of the cupped portions of said stampings and engaged by the inner portions of said plugs; and lubricant seals interposed between the center member and the inner surfaces of each of said yoke arms and engaging the inner portions of said plugs.

10. A universal joint comprising a pair of yokes, the arms of each yoke being provided with protuberances that project beyond the inner surfaces of the yoke arms, the inner portions of said protuberances being formed with races for antifriction devices; an oscillatory center member; stampings having stub portions anchored in diametrically opposite portions of said center member and having cup-shaped portions opening toward said yoke arms, said cup-shaped portions providing races that confront the races on said protuberances; a plurality of anti-friction devices cooperating with each of said confronting races; and lubricant seals interposed between the center member and the inner surfaces of each of said yoke arms and engaging the inner portions of said protuberances.

ARCHIBALD A. WARNER.

REFERENCES CITED

The following references are of record in the file of this patent:

UNITED STATES PATENTS

| Number | Name | Date |
|---|---|---|
| 634,540 | Prior | Oct. 10, 1899 |
| 1,604,202 | Smith-Clarke | Oct. 26, 1926 |
| 1,705,731 | Hufferd | Mar. 19, 1929 |
| 1,785,685 | Smith | Dec. 16, 1930 |
| 1,793,827 | Pribil | Feb. 24, 1931 |
| 2,024,777 | Neumann | Dec. 17, 1935 |
| 2,032,497 | Padgett | Mar. 3, 1936 |

FOREIGN PATENTS

| Number | Country | Date |
|---|---|---|
| 798,315 | France | Mar. 2, 1936 |